United States Patent [19]

Zayhowski et al.

[11] Patent Number: 5,022,745
[45] Date of Patent: Jun. 11, 1991

[54] ELECTROSTATICALLY DEFORMABLE SINGLE CRYSTAL DIELECTRICALLY COATED MIRROR

[75] Inventors: John J. Zayhowski, Pepperell; Aram Mooradian, Winchester, both of Mass.

[73] Assignee: Massachusetts Institute of Technology, Cambridge, Mass.

[21] Appl. No.: 404,176

[22] Filed: Sep. 7, 1989

[51] Int. Cl.$^5$ .......................... G02B 5/10; H01L 29/04
[52] U.S. Cl. ..................................... 350/608; 350/607; 357/60
[58] Field of Search ........... 350/607, 608, 609, 162.22, 350/612, 321; 357/60, 89; 250/331; 372/12, 19

[56] References Cited

U.S. PATENT DOCUMENTS 4,203,128  5/1980  Guckel et al. ......................... 357/60
4,680,767  7/1987  Hakimi et al. ......................... 372/12

OTHER PUBLICATIONS

Chau et al., Scaling Limits in Batch-Fabricated Silicon Pressure Sensors, IEEE Transactions on Electron Devices, vol. Ed-34, No. 4, Apr. 1987, pp. 850-858.

Primary Examiner—Bruce Y. Arnold
Assistant Examiner—James Phan
Attorney, Agent, or Firm—Hamilton, Brook, Smith & Reynolds

[57] ABSTRACT

An electrostatically deformable single crystal mirror comprising a highly conducting thick substrate layer and a highly conducting thin membrane layer separated from the thick layer by an insulator is disclosed. The center of the insulating layer is etched to form a cavity. The outer surface of the membrane layer is polished and coated with a dielectric to form a mirror. A voltage is applied between the membrane and the substrate to cause the membrane to deform. Various embodiments of the invention provide for planar translation of the mirror and for convex/concave deformation of the mirror. Incorporation of a deformation sensor in the deformable mirror allows for deformation measurement. In a particular embodiment of the invention, the deformable mirror is used in a tunable etalon for use in an optical filter.

9 Claims, 4 Drawing Sheets

ELECTROSTATICALLY DEFORMABLE SINGLE CRYSTAL DIELECTRICALLY COATED MIRROR

The Government has rights in this invention pursuant to Contract Number F19628-85-C-0002 awarded by the Office of the Air Force.

BACKGROUND OF THE INVENTION

This invention relates to the field of optical mirrors.

Movable mirrors are frequently used to direct a beam of light or to change the resonant frequency of an optical resonant cavity. Typically, such mirrors are moved piezo-electrically, and also typically, their inertia prevents their being moved rapidly. In addition, piezo-electric devices have hysteresis in their performance.

A type of low inertia movable surface can be created in which electrostatic forces are used to move a thin membrane rapidly. The first attempt at creating such an electrostatically deformable membrane is described in the patent of Guckel et al. (U.S. Pat. No. 4,203,128).

Guckel et al. formed a silicon membrane by first exposing one surface of a silicon wafer to boron gas to form a shallow boron doped layer. The wafer was then etched from the other side until only a thin membrane defined by the boron-doped region remained. Such a process yielded a membrane which was thick and so was suitable in electro-mechanical applications. The membrane was too thin, however, to support the high-quality, multilayer, dielectric coatings required for many optical applications.

Advances in optics, and the widespread use of lasers, has increased the demand for movable mirrors for use in tunable filters and steering laser beams. This invention provides a low inertia mirror which can be moved rapidly. In addition, the invention can be used to create devices, such as curved mirrors with a variable focal length, which are not practical using the teachings of the prior art.

SUMMARY OF THE INVENTION

The invention relates to an electrostatically deformable single crystal mirror comprising a highly conducting thick substrate layer and a highly conducting thin membrane layer separated from the thick layer by an insulating layer. The center of the insulating layer is etched away to form a cavity. The outer surface of the membrane layer is polished and coated with a dielectric to form a mirror. A voltage is applied between the membrane and the substrate to cause the membrane to deform.

Another aspect of the invention is related to the formation of a membrane which undergoes a planar translation when a voltage is applied between the substrate and the membrane.

Another embodiment of the invention is related to an electrostatically deformable single crystal mirror comprising a highly conducting membrane layer located between a first highly conducting substrate layer and a second highly conducting substrate layer. The membrane is separated from the first substrate layer by a first insulating layer; the center of which has been etched away to form a first cavity. The membrane is also separated from the second substrate layer by a second insulating layer. The center of the second insulating layer is also etched away to form a second cavity. By applying voltages between a series of electrodes in each of the substrates and the membrane, the membrane surface is deformed. This deformation is such that a region of the membrane may undergo a convex deformation while an adjacent region of the membrane undergoes a concave deformation. Alternatively, such complex deformation can be accomplished with a single control substrate and direct control of the charge on the membrane.

Yet another aspect of the invention is the incorporation of a deformation sensor in the deformable mirror to measure the amount of deformation the mirror is undergoing.

Still another aspect of the invention is the incorporation of the deformable mirror in a tunable etalon for use in an optical filter.

BRIEF DESCRIPTION OF THE DRAWINGS

A more complete understanding of the invention may be obtained from the following description when taken in conjunction with the drawings, in which.

DESCRIPTION OF THE PREFERRED EMBODIMENTS

Figure 1A:
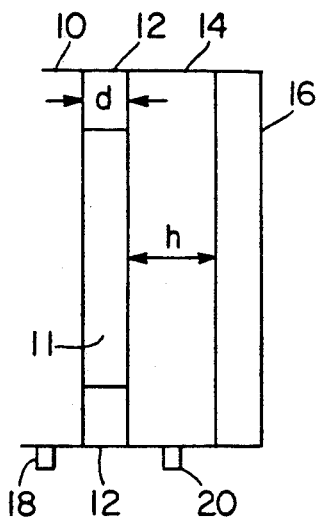
FIG. 1(a) is a cross-sectional view of a deformable mirror which is capable of changing the shape of the reflecting surface.

In one of the preferred embodiments, FIG. 1(a) a thick, substantially inflexible, highly doped, conducting silicon wafer forms the control surface 10 for the mirror. A thin second silicon wafer 14 with at least one surface polished optically flat is separated from the control surface 10 by an oxide insulating spacer layer 12. The thickness of this oxide layer (d) and the membrane depends upon the application, and more will be said about these layers shortly. A polished surface of the thin wafer 14 is dielectrically coated to form a mirror surface 16. The thin wafer is positioned such that the dielectrically coated surface 16 faces away from the control surface 10. The insulating layer 12 has been etched to form a cavity 11, FIG. 1(c). Radially extending grooves 13 etched in the oxide layer provide a channel from the inner edge of the cavity 11 to the outer edge of the oxide layer 12. These channels allow air to enter and to escape when the mirror is undergoing deformation. The channels may be omitted in specific applications since they can add a slow component to the response of the device due to the movement of air through the small channels. Two electrical contacts 18 and 20 are used to establish a potential difference between the thin silicon wafer 14 and the thick silicon wafer 10. Note that it is not necessary to have electrical contacts to both the control surface and the deformable membrane. With highly conductive materials, it is necessary only for one of them (the control surface or the membrane) to have an electrical contact, since the image charges induced in the other could be used to control the potential between the two surfaces.

Figure 1B:
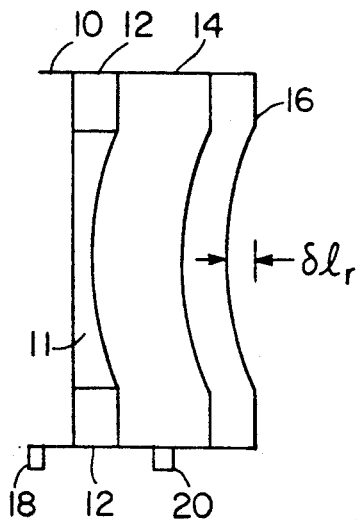
FIG. 1(b) is a cross-sectional view of the mirror of FIG. 1(a) undergoing a deformation.
Figure 1C:
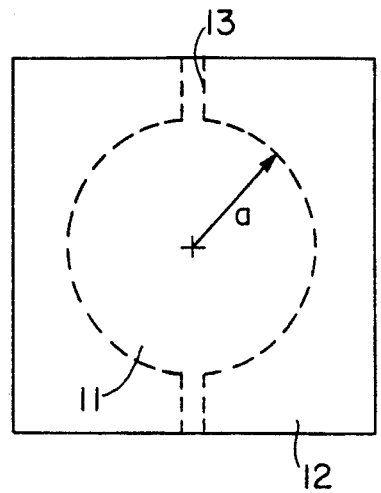
FIg. 1(c) is a plan view of the device of FIG. 1(a)

When a potential is applied between electrical contacts 18 and 20, FIG. 1(b), the electrostatic forces cause the membrane 14 to be attracted to the control surface 10. The amount of deflection $\delta l(r)$ is given by the formula:

$$\delta l(r) = \delta l(0) \cdot (1 - 2r^2/a^2 + r^4/a^4)$$

where:
$$\delta l(0) = (\tfrac{1}{2})(\epsilon V^2/d^2)[12(1-\nu^2)/(32 E)](a^4/h^3)$$

and where (in MKS units) ($\epsilon$) is the dielectric permittivity of free space ($0.8859 \times 10^{-11}$), ($\nu$) is Poisson's ratio (for silicon, $\sim 0.2$), (E) is Young's modulus (for silicon, $1.6 \times 10^{11}$), (V) is the applied voltage, (d) is the thickness of the oxide spacer, (h) is the thickness of the thin silicon wafer and (a) is the radius of the etched region in the assumes that the amount of deflection is small relative to the thickness of the oxide layer; that the thin silicon wafer is stress free; and that the effects of the dielectric coating on the thin wafer are negligible. These assumptions are not essential to the performance of the device.

Assuming that the mirror is initially flat and that only a small center portion of the mirror is used, the deformation results in a curved mirror which has a focal length equal to
$$f = (a^2/4\delta l(0))$$

Thus, the deformable mirror generates a focal length which can be varied inversely as the square of the applied voltage.

Mechanical resonance determines how fast the device can be driven. The lowest mechanical resonance of this embodiment, neglecting viscous damping, and retaining only the first order terms, is given by:

$$\omega = 1.03(\pi^2 h/a^2)(E/(12(1-\nu^2)\rho))^{\frac{1}{2}}.$$

where $\rho$ is the density of the thin wafer (for silicon $\sim 2330$ in MKS units).

Figure 1D:
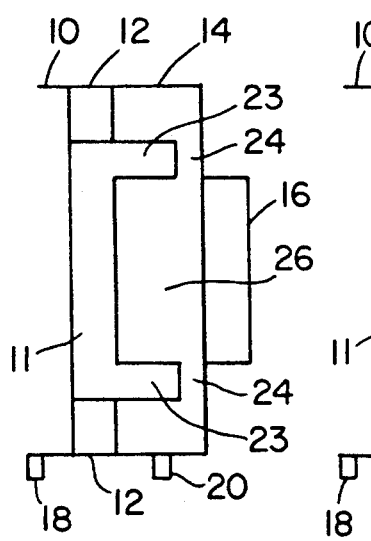
FIG. 1(d) is a cross-sectional view of a deformable mirror which is capable of undergoing parallel planar motion perpendicular to the plane of the surface.
Figure 1E:
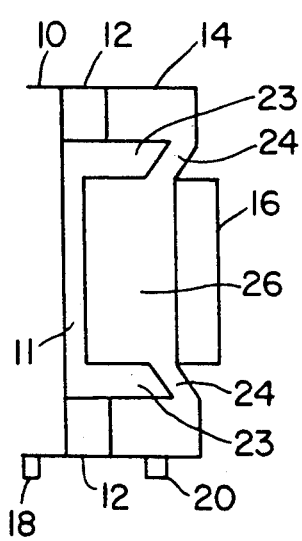
FIG. 1(e) is a cross-sectional view of the mirror of FIG. 1(d) undergoing a translation.
Figure 1F:
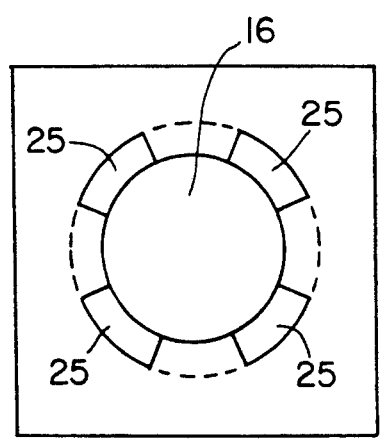
FIg. 1(f) is a plan view of the device of FIG. 1(d)

Another embodiment of the invention is shown in FIG. 1(d). In this embodiment, an annular groove 23 is cut into the thin wafer 14 to provide a thin membrane region 24 and a central thick region 26. Only the thick central region 26 is dielectrically coated to form a mirror 16. Air escapes through openings 25 cut perpendicularly through the surface of the thin membrane-region 24 (FIG. 1(f)). These openings also serve to decrease the amount of voltage required for a given amount of deflection. Again an insulator 12 separates the thick wafer 10 and the thin wafer 14. When a voltage is applied to the electrical contacts 18 and 20, the electrostatic forces cause the thin membrane region 24 to flex, allowing the central region 26 to move toward the control surface 10 as a parallel plane. This parallel planar motion is especially useful when the mirror is used in a tuning etalon.

Figure 2:
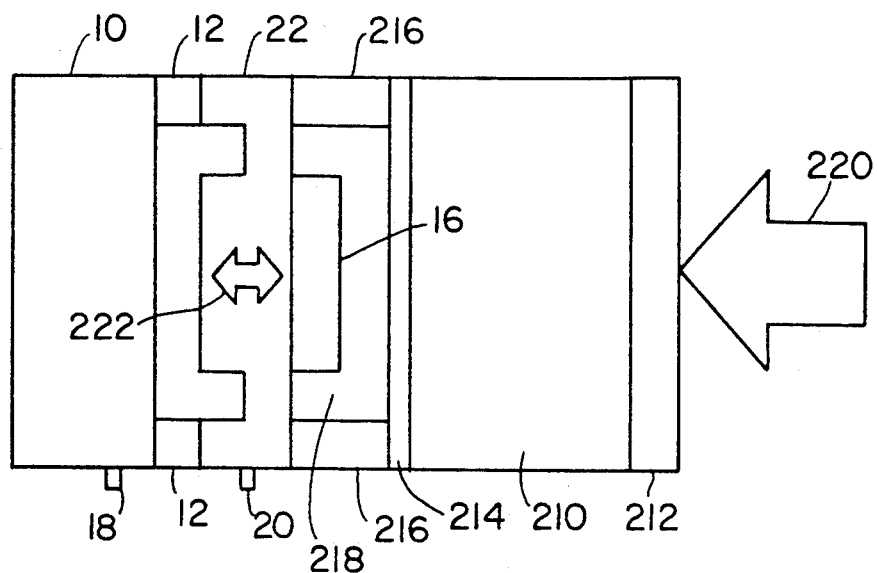
FIG. 2 is a cross-sectional view of a laser tuned with a parallel planar mirror.

Referring to FIG. 2, one application of a tunable etalon is as a resonant cavity of a laser. A gain medium 210 is dielectrically coated with a dichroic mirror 212 on one side and an antireflection coating 214 on the other. The dichroic mirror 212 is designed to be highly reflecting at the operating wavelength of the laser and forms one mirror of the tunable laser cavity. This mirror 212 is transmitting at the wavelength used to optically pump the laser. The laser cavity is completed by a second partially transmitting mirror 16 mounted on an electrically deformable membrane 22. A voltage applied between the electrical contacts 18 and 20 of the controlling substrate 10 and the deformable membrane 22 causes the mirror surface 16 to move in the direction of the cavity axis while maintaining its orientation parallel to the plane of the controlling substrate 10, as shown by double arrow 222. By varying the voltage, one can change the length of the resonant cavity 218 and hence the frequency at which the laser operates.

When the deformable mirror is used to tune a high-Q optical resonant cavity (such as for the laser cavity just discussed), the motion of the mirror will change the resonant frequency of the cavity by $$\delta \nu = \nu \cdot (\delta l)/l.$$

where $\delta \nu$ is the frequency change, $\nu$ is the initial operating frequency of the cavity, $\delta l$ is the change in cavity length and l. is the initial cavity length. As an example, if the initial cavity length is 750 $\mu$m and the initial operating wavelength is 11.06 $\mu$m, the cavity frequency will change 400 MHz for every nanometer of length change. Therefore, if this device is used to tune a Nd:YAG microchip laser with a cavity length of 750 $\mu$m operating at 1.06 $\mu$m, having a thin wafer thickness of 0.2 mm and a circular opening in the spacer of radius 5 mm, three volts will tune the laser 200 MHz. Further, the first mechanical resonance for this mirror (neglecting viscous damping) is at 165 kHz, so that the etalon can be tuned at high rates.

Figure 2A:
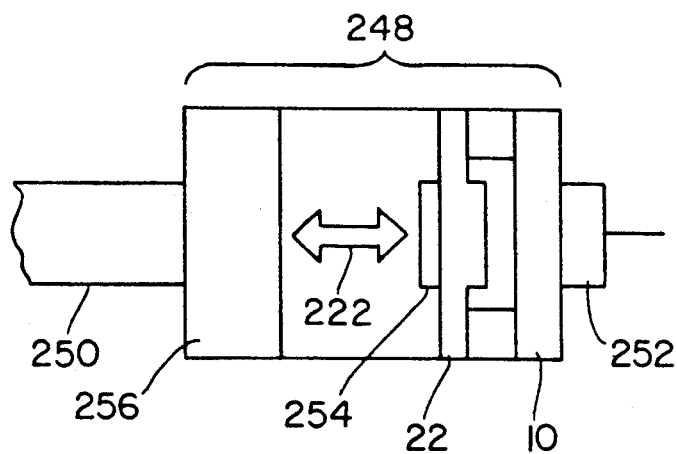
FIG. 2(a) is a cross-sectional view of an etalon used as a filter in a fiber optic communications application.

Additionally, tunable etalons may be used as tunable optical filters For example, in frequency multiplexed optical communications, such filters can be used to select one communications channel from among many channels on a fiber optic cable. Referring to FIG. 2(a) such a filter 248, connected to an optical fiber 250, comprises a partially transmitting mirror 256 and a deformable membrane 22 with a partially reflecting mirror surface 254. Adjacent the filter is a photodetector 252 which receives light transmitted through the filter. As the deformable mirror 22 moves in an axial direction 222 relative to the fiber 250, different wavelengths are selected by the filter for transmission to the detector 252.

Figure 3:
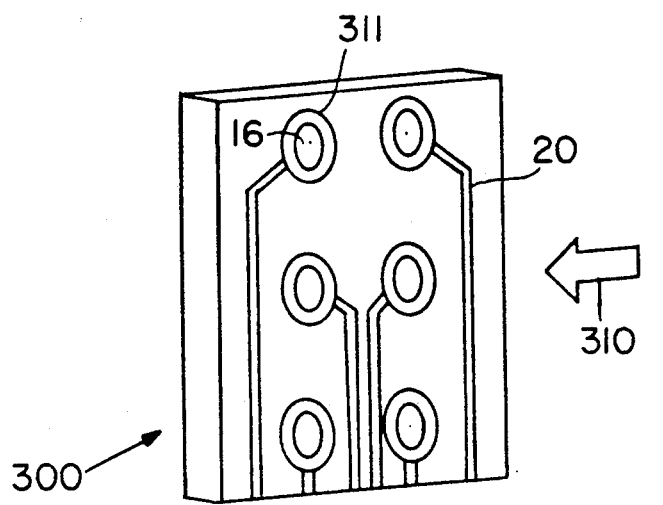
FIG. 3 is a perspective diagram of an array of deformable mirrors.

Many deformable mirrors can be fabricated upon a single wafer. Referring to FIG. 3, a wafer 300 is shown with six deformable mirrors. A series of electrical contacts 20 provide the electrical connections the highly deformable conducting regions 16 of each of the mirrors. These electrodes can be either transparent to the incoming light 310 or may be formed as a conducting contact ring 311 around a central mirror surface 16. With such an array of mirrors, an incident light beam can be steered by selecting the appropriate deformation for each of the mirrors. Such highly conducting regions of the deformable mirrors can be defined and isolated from each other using well known semiconductor techniques.

Figure 4:
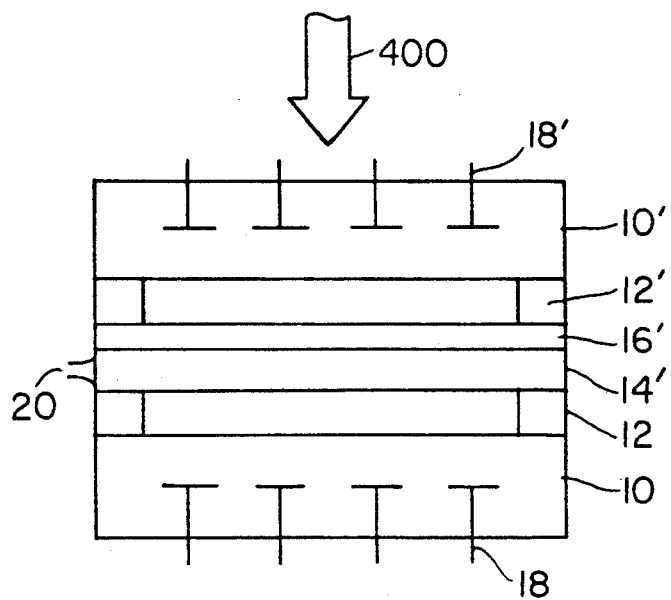
FIG. 4 is a cross-sectional view of an embodiment of the deformable mirror having two controllable surfaces.

The deformable surface need not only be used to form a concave mirror. Referring to FIG. 4, if the deformable membrane 14 is sandwiched between two control surfaces 10, 10' and separated from the control surfaces by spacers 12, 12'. The deformable surface may be controlled by two sets of highly conducting regions on the two control surfaces connected to the electrical contacts 18, 18'. As the membrane 14 deforms, the mirror surface 16 will also deform permitting the formation of a geometrically complex mirror surface. In this embodiment, the control surface 10' must be transparent to the incident radiation 400.

An alternative way of forming geometrically complex mirror surfaces with both concave and convex regions, with only one control surface, is to directly control the charge distribution on the deformable membrane. This can be done through the use of a charge coupled device created on the deformable membrane using current integrated circuit technology. Using bipolar technology, the net charge at a given point in the membrane may be either positive or negative. As a result that point may be attracted to, or repelled from, either a fixed voltage or a fixed amount of charge on the control surface. Either electrical or optical methods may be used to control the charge distribution in the charge coupled device. It should be apparent that the charge may be directly controlled on the control surface in addition to, or instead of, on the deformable membrane.

Figure 5:
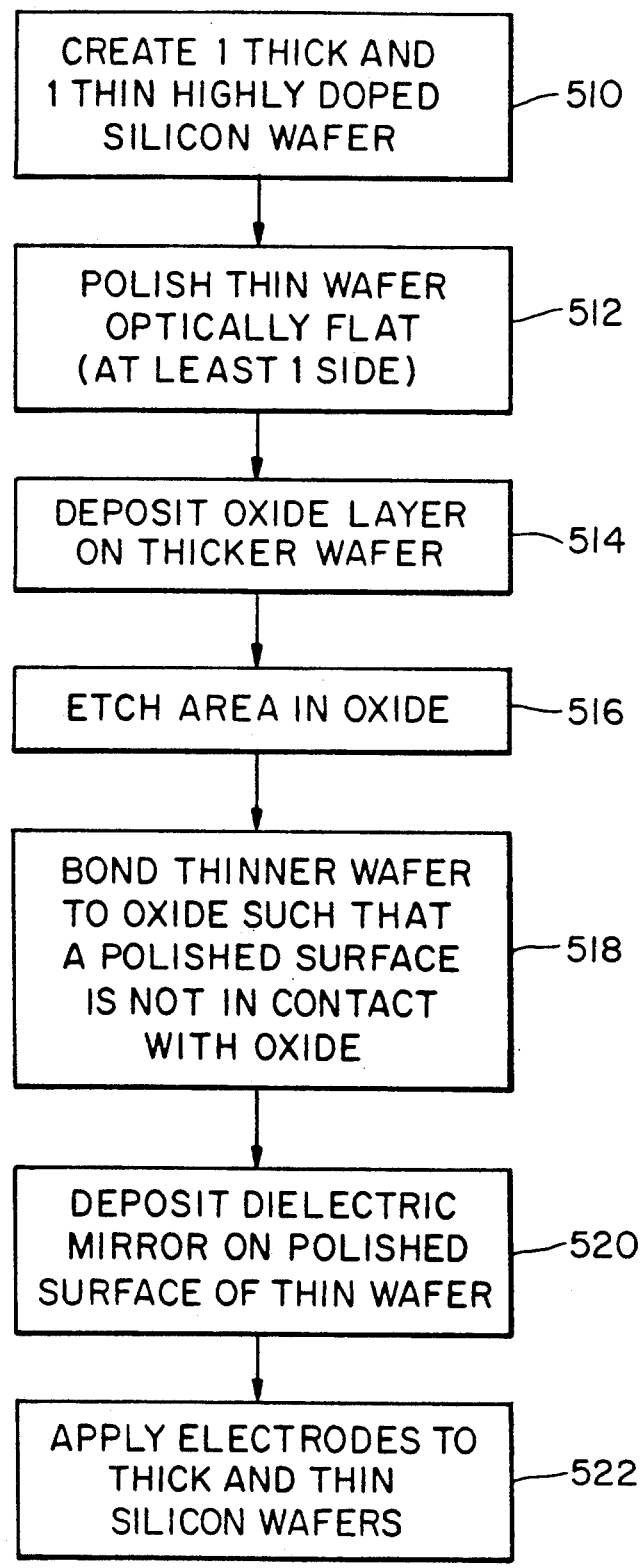
FIG. 5 is a flow chart of the process used to create a deformable mirror.

Referring to FIG. 5, to fabricate an electrostatically deformable single crystal dielectrically coated mirror, two highly doped silicon wafers are created with one wafer being much thicker than the other 510. At least one surface of the thinner wafer is polished optically flat 512 to within a fraction of a wavelength. An oxide layer 514 is deposited on the surface of the thicker wafer. An area in the center of the oxide is then etched away 516 to form a cavity. If the device requires channels for air to escape upon deformation, they are etched from the inner edge of the cavity to the outer edge of the oxide layer. It should be apparent that the etched region in the oxide need not be circular. The thinner wafer is then bonded to the thicker wafer 518 such that the oxide acts as a spacer between the two, with the polished surface of the thinner wafer facing away from the thicker wafer. A dielectric mirror is then deposited 520 on the outer polished surface of the thinner wafer. An electrical contact is then applied 522 to each of the thicker and the thinner wafers.

Figure 6:
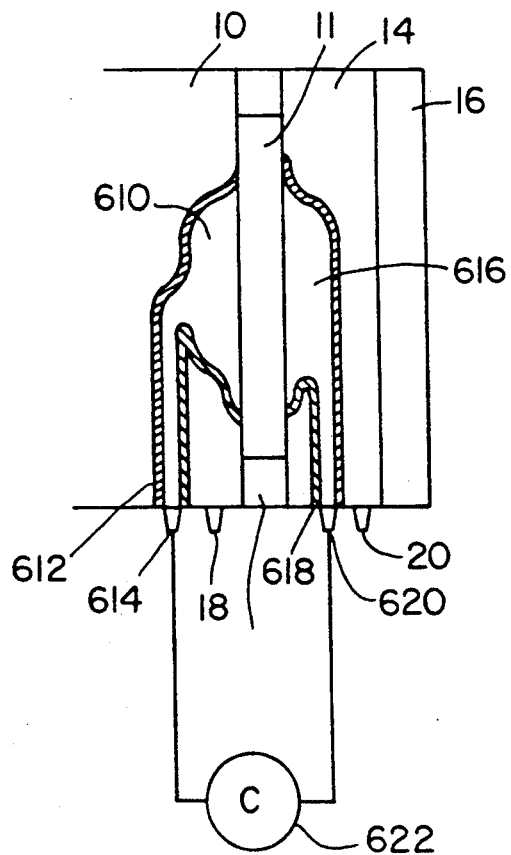
FIG. 6 is a schematic diagram of a deformable mirror with an incorporated capacitive transducer.

In addition, the amount of deformation of the deformable mirror may be measured directly to provide feedback information. This can be done by fabricating a position transducer, such as a piezo-electric strain gauge or capacitive position transducer, upon the deformable mirror FIG. 6 depicts an embodiment of the deformable mirror with a capacitive position transducer incorporated.

In this embodiment, one doped region 610, located within but isolated from the control surface 10 by an insulating layer 612 acts as one plate of a capacitor and is connected by an electrode 614 to one terminal of one arm of a high frequency capacitance measurement bridge 622. A second doped region 616 located within but isolated from the membrane 14 by an insulating layer 618 acts as the other plate of the capacitor and is connected by an electrode 620 to the other terminal of the arm of the high frequency capacitance measurement bridge 622. As the membrane 14 is deformed, the doped regions 610 and 616 move relative to one another and change the capacitance measured by the bridge 622. By measuring the change in capacitance, the deformation of the mirror can be determined. Alternatively, the doped regions 610 and 616 can be eliminated entirely by allowing the membrane 14 and the control surface 10 to act as the plates of the capacitor. The use of the membrane 14 and control surface 10, both to cause the deflection and to measure the deflection, can be accomplished simply by connecting electrodes 18 and 20 to a high frequency capacitance measurement bridge, and choosing a bridge frequency much higher than that to which the mirror can physically respond. In this way, the control of the mirror and the measurement of the deformation can be accomplished using the same electrodes and without further fabrication. Other transducers, such as piezo-electric strain gauges, can be fabricated on the mirror using standard techniques and can also be used to measure the deformation of the mirror. The deformation information so provided can be used in a feedback loop to control the voltage to the mirror and hence the mirror's deformation.

Having shown a number of embodiments, those skilled in the art will realize many variations are possible which will still be within the scope and spirit of the claimed invention. Therefore, it is the intention to limit the invention only as indicated by the scope of the claims.

What is claimed is:

1. A resonant cavity for a laser formed by two opposing mirrors one of which is an electrostatically deformable single crystal dielectrically coated mirror comprising:
   a thick substrate;
   an insulating layer on said thick substrate, from which a central region has been removed;
   a thin substrate on said insulating layer having at least one polished surface on a side opposite said insulating layer,;
   a mirror layer on said polished surface of said thin substrate which thin substrate is substantially thicker than 10 microns and is sufficiently thick to support said mirror layer but thin enough to deform upon application of a potential between said thin and thick substrates; and
   at least one electrical contact adapted to provide a potential between said thick substrate and said thin substrate to cause said thin substrate to deform and thereby change the resonance of the cavity to tune the laser frequency.

2. The cavity of claim 1 wherein the thick and the thin substrates are silicon.

3. The cavity of claim 1 wherein said insulating layer further comprises at least one path extending from said central region to an outer edge of the insulating layer.

4. The cavity of claim 1 wherein the insulating layer is an oxide.

5. The cavity of claim 1 wherein the mirror layer is a multilayer dielectric stack deposited onto the polished surface of said thin layer.

6. An electrically translatable mirror comprising:
   a thick substrate,
   an insulating layer on said thick substrate from which a central region has been removed;
   a thin substrate on said insulating layer having at lest one polished surface on a side opposite said insulating layer, said thin substrate having a relatively thicker center portion isolated from a relatively thicker outer portion by a continuous channel portion etched into said thin substrate;

a mirror layer on said polished surface of said thin substrate which thin substrate has a thickness at the relatively thicker portion which is substantially greater than 10 microns and upon application of a potential between said thin and thick substrate the center portion of the thin substrate moves toward the thick substrate in a parallel plane while the channel portions flexes; and at least one electrode adapted to provide a potential between said thick substrate and said thin substrate to cause said thin substrate to deform.

7. The mirror of claim 6 wherein said insulating layer further comprises at least one path extending from said removed region to an outer edge of the insulating layer.

8. An electrostatically deformable single crystal mirror comprising:

a first highly doped thick, substantially inflexible, substrate layer;

a second highly doped thick, substantially inflexible substrate layer, a highly doped membrane layer having a polished surface located between said first and second highly doped substrate layers and separated from said first substrate layer by a first insulating layer, said first insulating layer having a central region etched away to form a first cavity between said first substrate and said membrane and separated from said second substrate layer by a second insulating layer, said second insulating layer having a central region etched away to form a second cavity between said second substrate and membrane;

a mirror layer applied to said polished surface of said membrane, and a plurality of electrodes distributed over each substrate such that an individual electrode may have a potential placed between it and the membrane.

9. An electrostatically deformable single crystal dielectrically coated mirror comprising:

a thick substrate adapted to permit the voltage or charge at one surface to be controlled;

an insulating layer, from which a region has been removed, said insulating layer bonded to said thick substrate;

a thin substrate adapted to permit the voltage or charge at one surface to be controlled, said thin substrate having at least one polished surface, said thin substrate, bonded to said insulating layer such that a polished surface is not bonded to said insulating layer;

a mirror layer applied to said polished unbonded surface of said thin substrate;

at least one electrical contact adapted to control a potential between said thick substrate and said thin substrate; and a position transducer attached to said mirror for measuring the amount of deformation in said mirror, said position transducer comprising:

(i) a doped region within but electrically isolated from said thick substrate;

(ii) a second doped region within but electrically isolated from said thin substrate;

(iii) a first capacitor electrode connected to said doped region for connection to one terminal of an arm of a high frequency capacitance measurement bridge; and (iv) a second capacitor electrode connected to said second doped region for connection to a second terminal of an arm of the high frequency capacitance measurement bridge.

* * * * *

UNITED STATES PATENT AND TRADEMARK OFFICE
CERTIFICATE OF CORRECTION

PATENT NO. : 5,022,745

DATED : June 11, 1991

INVENTOR(S) : John J. Zayhowski and Aram Mooradian

It is certified that error appears in the above-identified patent and that said Letters Patent is hereby corrected as shown below:

Col. 6, line 63, delete "lest" and insert ---least---.

Col. 7, line 9, delete "portions" and insert ---portion---.

Signed and Sealed this

Twenty-second Day of December, 1992

Attest:

DOUGLAS B. COMER

*Attesting Officer*   *Acting Commissioner of Patents and Trademarks*